United States Patent
Takeda et al.

(10) Patent No.: US 11,696,302 B2
(45) Date of Patent: Jul. 4, 2023

(54) USER TERMINAL

(71) Applicant: NTT DOCOMO, INC., Tokyo (JP)

(72) Inventors: Kazuki Takeda, Tokyo (JP); Yuki Matsumura, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 119 days.

(21) Appl. No.: 17/274,659

(22) PCT Filed: Sep. 10, 2018

(86) PCT No.: PCT/JP2018/033505
§ 371 (c)(1),
(2) Date: Mar. 9, 2021

(87) PCT Pub. No.: WO2020/053940
PCT Pub. Date: Mar. 19, 2020

(65) Prior Publication Data
US 2021/0258936 A1 Aug. 19, 2021

(51) Int. Cl.
*H04W 72/23* (2023.01)
(52) U.S. Cl.
CPC .................. *H04W 72/23* (2023.01)
(58) Field of Classification Search
CPC .................................. H04W 72/042
See application file for complete search history.

(56) References Cited

U.S. PATENT DOCUMENTS

2019/0349964 A1* 11/2019 Liou ................ H04W 72/1284

OTHER PUBLICATIONS

International Search Report issued in PCT/JP2018/033505 dated Nov. 27, 2018 (2 pages).
Written Opinion of the International Searching Authority issued in PCT/JP2018/033505 dated Nov. 27, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

Primary Examiner — Ronald B Abelson
(74) *Attorney, Agent, or Firm* — Osha Bergman Watanabe & Burton LLP

(57) ABSTRACT

A user terminal according to an aspect of the present disclosure includes: a receiving section that receives configuration information of a plurality of control resource sets configured in a partial band in a carrier; and a control section that controls, when the plurality of control resource sets are configured to have different pieces of presence information indicating whether or not a certain field indicating a state of a transmission configuration indicator is present in a specific downlink control information (DCI) format, monitoring of downlink control information of the specific DCI format in a plurality of search spaces respectively associated with the plurality of control resource sets.

4 Claims, 14 Drawing Sheets

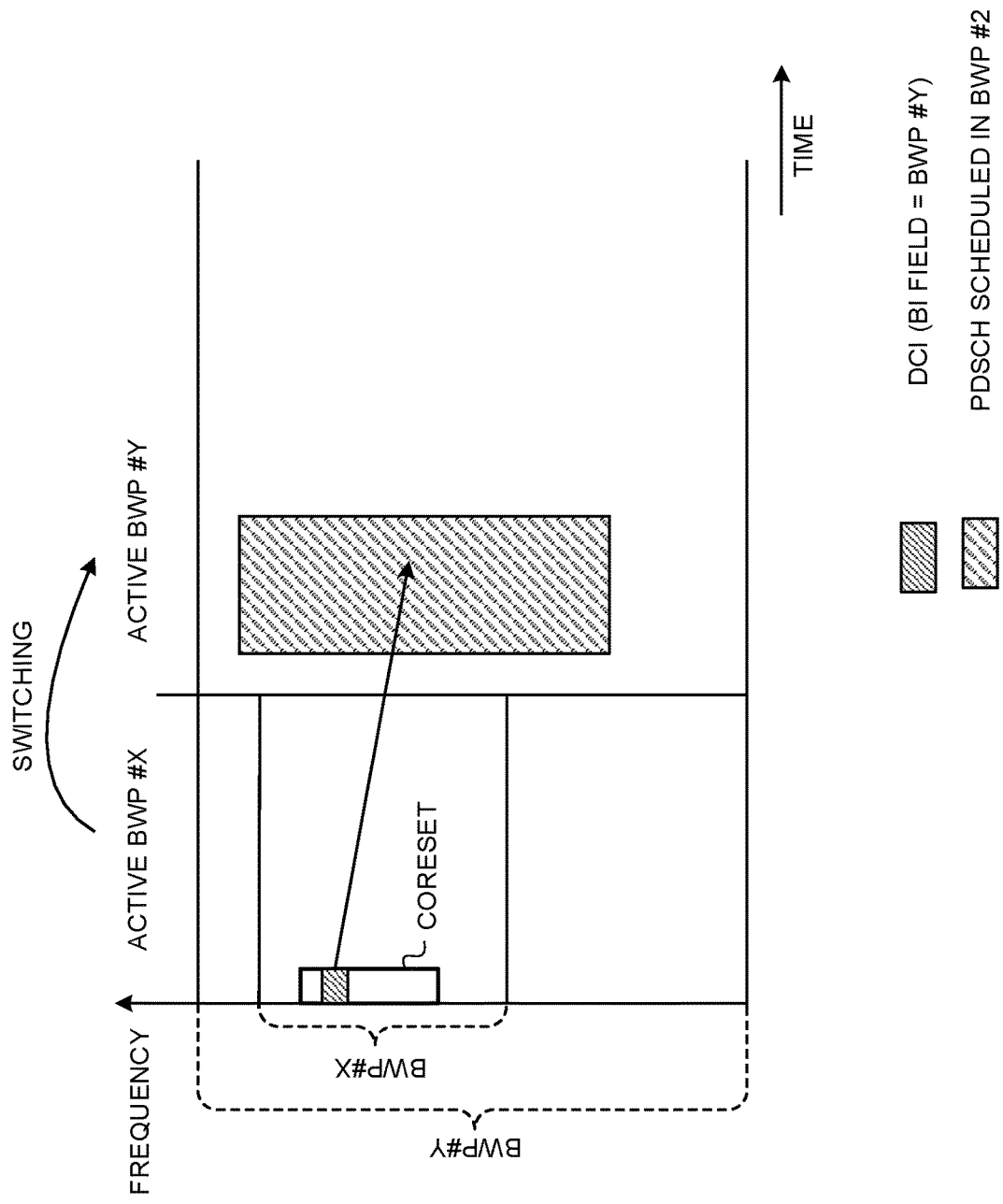

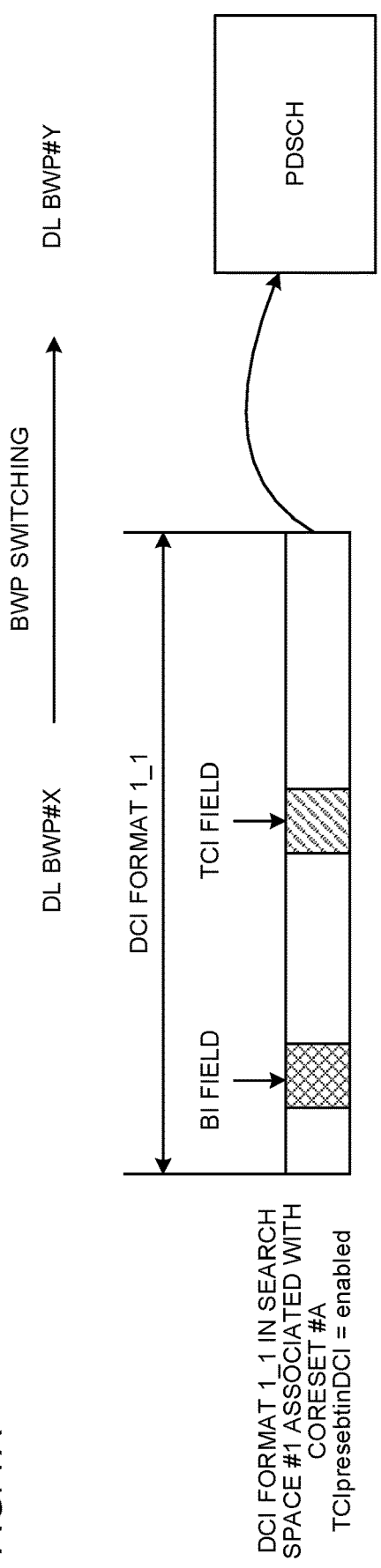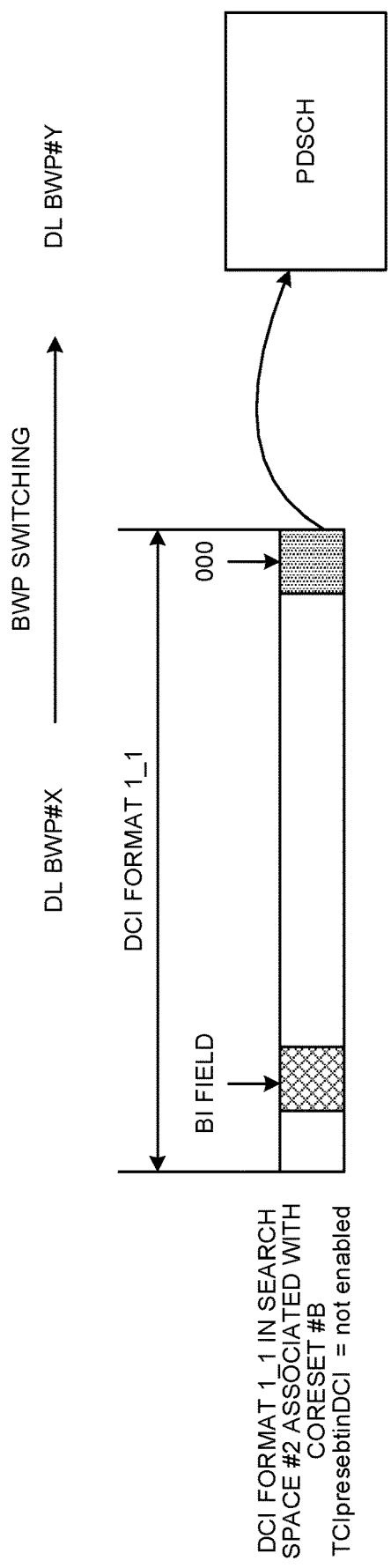

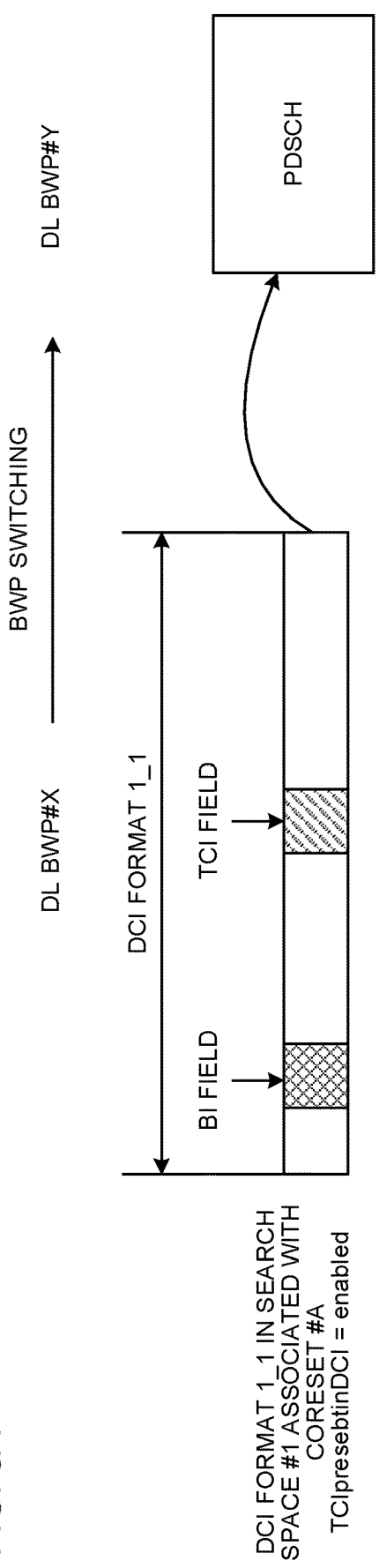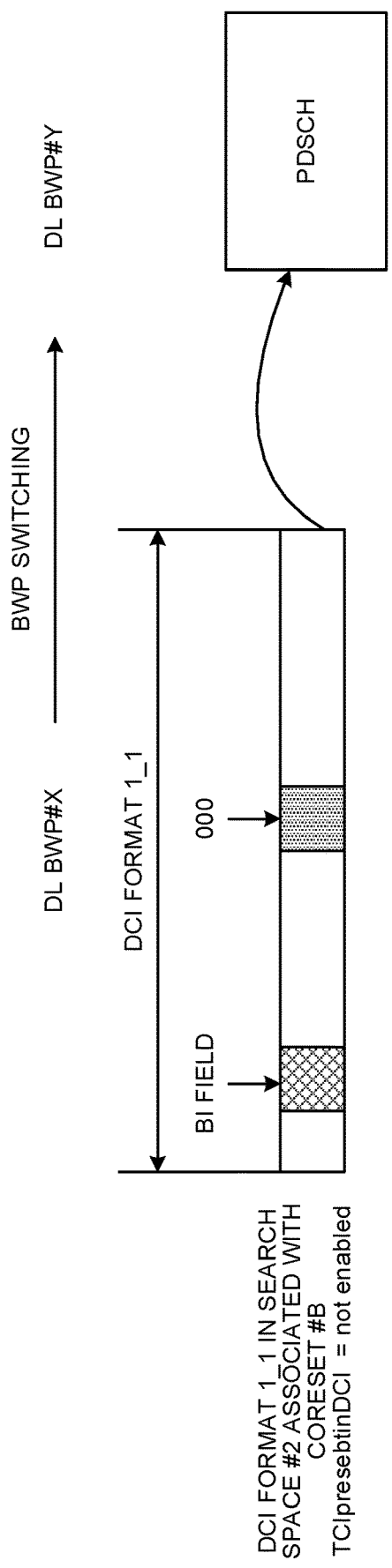

USER TERMINAL

TECHNICAL FIELD

The present disclosure relates to a user terminal in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a user terminal (UE (User Equipment)) controls reception of a downlink shared channel (for example, a PDSCH (Physical Downlink Shared Channel)), based on downlink control information (also referred to as DCI, a DL assignment, or the like) from a radio base station. The user terminal controls transmission of an uplink shared channel (for example, a PUSCH (Physical Uplink Shared Channel)), based on the DCI (also referred to as a UL grant or the like). A format of the DCI is also referred to as a DCI format or the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (hereinafter referred to as NR), the following scheme has been under study: the UE determines a relationship of quasi-co-location (QCL) of a downlink shared channel, based on a state of a transmission configuration indicator (TCI) (TCI state) indicated by a value of a certain field in a specific DCI format (for example, DCI format 1_1 or a DL assignment).

For NR, a scheme in which one or more partial bands (also referred to as bandwidth parts (BWPs) or the like) are configured in a carrier (component carrier (CC)) has been under study. A scheme in which one or more control resource sets (CORESETs) are configured in the BWP has also been under study.

However, when a plurality of CORESETs are configured in the BWP, monitoring (also referred to as blind decoding or the like) of the DCI in a plurality of search spaces respectively associated with the plurality of CORESETs may be unable to be appropriately controlled.

For example, when the plurality of CORESETs configured in the BWP are configured to have different pieces of information (also referred to as presence information, TCI presence information, tci-PresentInDCI, or the like) indicating whether or not a certain field indicating the TCI state is present in a specific DCI format, the sizes (payload sizes) of pieces of DCI monitored in the plurality of search spaces respectively associated with the plurality of CORESETs may be different from each other, so that monitoring of the DCI may be unable to be appropriately controlled.

In the light of this, the present disclosure has one object to provide a user terminal that can appropriately control monitoring of DCI in a plurality of search spaces respectively associated with a plurality of CORESETs configured in a BWP.

Solution to Problem

A user terminal according to an aspect of the present disclosure includes: a receiving section that receives configuration information of a plurality of control resource sets configured in a partial band in a carrier; and a control section that controls, when the plurality of control resource sets are configured to have different pieces of presence information indicating whether or not a certain field indicating a state of a transmission configuration indicator is present in a specific downlink control information (DCI) format, monitoring of downlink control information of the specific DCI format in a plurality of search spaces respectively associated with the plurality of control resource sets.

Advantageous Effects of Invention

According to an aspect of the present disclosure, monitoring of the DCI in the plurality of search spaces respectively associated with the plurality of CORESETs configured in the BWP can be appropriately controlled.

BRIEF DESCRIPTION OF DRAWINGS

FIG. 1 is a diagram to show an example of BWP switching;

FIGS. 7A and 7B are diagrams to show an example of BWP switching according to a third aspect;

FIGS. 8A and 8B are diagrams to show another example of BWP switching according to the third aspect;

DESCRIPTION OF EMBODIMENTS (QCL for PDSCH)

Figure 2A:
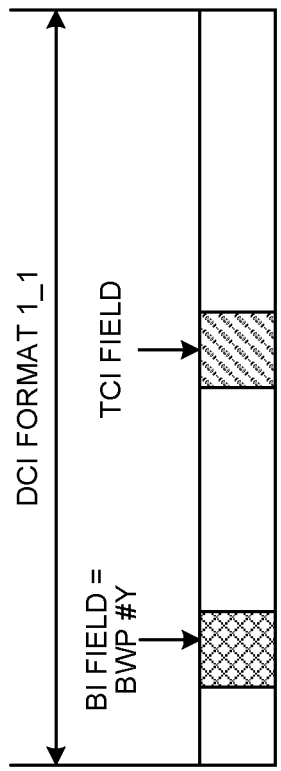
FIGS. 2A and 2B are diagrams to show an example of DCI when BWP #X in which a plurality of CORESETs having different pieces of TCI presence information are configured is switched to BWP #Y.

For NR, the following scheme has been under study: a UE controls reception processing (for example, at least one of demapping, demodulation, and decoding) of a downlink shared channel (for example, a PDSCH), based on information related to quasi-co-location (QCL) of the downlink shared channel.

Here, QCL refers to an indicator that indicates statistical properties of a channel. For example, QCL refers to a case in which, when a certain signal and another signal are in a relationship of QCL, it is assumable that at least one of Doppler shift, a Doppler spread, an average delay, a delay spread, and a spatial parameter (for example, a spatial reception parameter (Spatial Rx Parameter)) is the same between such a plurality of different signals. QCL may be referred to as spatial QCL or the like.

In QCL, one or more types (QCL types), which have different parameter(s) that can be assumed to be the same, may be provided. For example, four QCL types A to D, which have different parameter(s) that can be assumed to be the same, may be provided.

QCL type A: QCL in which the Doppler shift, the Doppler spread, the average delay, and the delay spread can be assumed to be the same QCL type B: QCL in which the Doppler shift and the Doppler spread can be assumed to be the same QCL type C: QCL in which the average delay and the Doppler shift can be assumed to be the same QCL type D: QCL in which the spatial reception parameter can be assumed to be the same A state of a transmission configuration indicator (TCI) (TCI state (TCI-state)) may indicate (may include) information related to QCL (also referred to as QCL information or the like) for the PDSCH. The QCL information for the PDSCH is, for example, information related to QCL between the PDSCH (or a DMRS port for the PDSCH) and a downlink reference signal (DL-RS), and may include, for example, at least one of information (DL-RS related information) that is related to the DL-RS to have a QCL relationship and information (QCL type information) that indicates the QCL type.

Here, the DMRS port is an antenna port for a demodulation reference signal (DMRS). The DMRS port may be a DMRS port group including a plurality of DMRS ports, and the DMRS port in this specification may be interpreted as a DMRS port group.

The DL-RS related information may include at least one of information indicating the DL-RS to have a QCL relationship and information indicating resources of the DL-RS.

For example, when one or more reference signal sets (RS sets) are configured for the UE, the DL-RS related information may indicate a certain DL-RS to have a QCL relationship with the PDSCH (or the DMRS port for the PDSCH) among the reference signals included in the RS set and resources for the DL-RS.

Here, the DL-RS may be at least one of a synchronization signal (SS) (for example, at least one of a primary synchronization signal (PSS) and a secondary synchronization signal (SSS)), a mobility reference signal (MRS (Mobility RS)), a channel state information reference signal (Channel Satate Information-Reference Signal (CSI-RS)), a demodulation reference signal (DMRS), a broadcast channel (PBCH (Physical Broadcast Channel)), a beam-specific signal, and the like, or a signal configured by enhancing and/or modifying these (for example, a signal configured by changing density and/or a period).

Note that a block including the SS and the PBCH is also referred to as a synchronization signal block (SSB), an SS/PBCH block, or the like.

As described above, each TCI state can indicate (can include) the QCL information for the PDSCH. For the UE, one or more TCI states (one or more pieces of QCL information for the PDSCH) may be reported (configured) from the base station by using higher layer signaling (for example, RRC signaling).

DCI (DL assignment, for example, DCI format 1_1) used for scheduling of the PDSCH may include a certain field indicating the TCI state (QCL information for the PDSCH) (also referred to as, for example, a transmission configuration indicator (TCI: Transmission configuration indication) field, a TCI state field, or the like). The TCI field may be constituted with a certain number of bits (for example, 3 bits).

For example, when the DCI includes the TCI field of 3 bits, the radio base station may configure a maximum of eight types of TCI states for the user terminal in advance by using higher layer signaling. A value of the TCI field in the DCI (TCI field value) may indicate one of the TCI states configured in advance by using higher layer signaling.

Here, the higher layer signaling may be, for example, at least one of RRC (Radio Resource Control) signaling, broadcast information (for example, an MIB (Master Information Block)), system information (for example, an SIB (System Information Block), RMSI (Remaining Minimum System Information), or the like).

When more than eight types of TCI states are configured for the user terminal, eight or less types of TCI states may be activated (specified) by using a MAC control element (MAC CE (Medium Access Control Control Element)) (also referred to as an activation command or the like). The TCI field value in the DCI may indicate one of the TCI states activated by using the MAC CE.

When transmission confirmation information (HARQ-ACK (Hybrid Automatic Repeat reQuest-Acknowledge)) of the PDSCH for transmitting the activation command is transmitted in slot n, mapping between the TCI state and the value (code point) of the TCI field in the DCI may be applied after a certain period from the slot n. The certain period may be determined based on the number $N^{subframe,\mu}_{slot}$ of slots for each subcarrier spacing μ per subframe.

For example, each of the eight types of values (code points) "000" to "111" of the TCI field of 3 bits may be associated with the TCI state that is configured by using higher layer signaling (or that is configured by using higher layer signaling and is activated by using the MAC CE).

Note that the TCI state of the PDSCH may be configured or activated for each carrier (CC, cell) in which the PDSCH is scheduled by using the DCI or a partial band (bandwidth part (BWP)) in the carrier.

The user terminal determines QCL of the PDSCH (or the DMRS port of the PDSCH), based on the TCI state indicated by the value (code point) of the TCI field in the DCI. For example, the user terminal controls reception processing (for example, decoding processing and/or demodulation processing or the like) of the PDSCH, by assuming that the DMRS port (or the DMRS port group) of the PDSCH of a serving cell (or the BWP) is in QCL with the DL-RS corresponding to the TCI state reported by using the DCI. In this manner, reception accuracy of the PDSCH can be enhanced.

The UE may receive, from the base station, information indicating whether or not the TCI field (TCI state) is present in the DCI (also referred to as presence information, TCI presence information, tci-PresentInDCI, or the like). For example, the UE may receive the TCI presence information by using higher layer signaling. The UE may receive the TCI presence information for each control resource set (CORESET).

The CORESET is a resource domain for control, and may include one or more time domain resources (for example, symbols) and one or more frequency domain resources (for example, physical resource blocks (PRBs). The CORESET may be associated with a search space, which includes one or more candidate resources (PDCCH candidates) to which a downlink control channel (PDCCH (Physical Downlink Control Channel)) is mapped.

When the TCI presence information is not reported (not enabled or disabled), the UE may assume that the TCI field is not present in the DCI. On the other hand, when the TCI presence information is reported (enabled), the UE may assume that the TCI field is present in the DCI.

When the TCI presence information is disabled, "0s (zeros)" of as many bits as those of the TCI field may be appended to the DCI (for example, DCI format 1_1). In this manner, the numbers of bits of pieces of DCI become equal, regardless of whether or not the TCI presence information is enabled. As a result, the number of bits of pieces of DCI can be prevented from being changed depending on whether or not the TCI field is included in the pieces of DCI, and the UE can appropriately control monitoring (blind decoding) of the pieces of DCI.

(BWP Switching)

When a plurality of BWPs used for at least one of downlink (DL) and uplink (UL) (DL/UL) of a DL and a UL are configured high in a carrier, at least one of activation and deactivation (activation/deactivation) of at least one of the plurality of BWPs is controlled. In other words, the BWPs applied by the UE for transmission and reception of a signal are switched. In this manner, the operation in which the BWPs are switched may be referred to as BWP switching.

FIG. 1 is a diagram to show an example of BWP switching. FIG. 1 shows an example of switching from BWP #X to BWP #Y. Note that FIG. 1 shows an example in which the bandwidth of BWP #Y is wider than the bandwidth of BWP #X, but this is not restrictive.

In FIG. 1, the UE monitors a search space associated with a control resource set (CORESET) of an activated BWP (active BWP) #X, and detects the DCI (a DL assignment or a UL grant, for example, DCI format 1_1 or 0_1) for scheduling the shared channel (for example, the PDSCH or the PUSCH) of BWP #Y.

Although the DCI is transmitted using the CORESET that is configured in BWP #X, a certain field (for example, a BWP Indicator (BI) field) in the DCI may indicate another BWP #Y. In this manner, when the DCI detected in the CORESET that is configured for the current active BWP is used to schedule the PDSCH or the PUSCH of another BWP, the current active BWP is deactivated, and such another BWP may be activated.

The size of the DCI may be increased or reduced so as to match the bandwidth of such another BWP. For example, in FIG. 1, the bandwidth of BWP #Y is wider than the bandwidth of BWP #X, and thus zero padding may be applied to certain bits (for example, a certain number of most significant bits (MSB)) in the DCI. Note that, although not shown, when the bandwidth of BWP #Y is narrower than the bandwidth of BWP #X, certain bits (for example, a certain number of MSBs) in the DCI may be truncated.

When zero padding is applied to the DCI, the UE may ignore a certain field. For example, when BWP #X is configured with one transport block (TB) and BWP #Y specified by using the DCI is configured with two TBs in FIG. 1, the UE may ignore a certain field for TB2 (for example, a modulation and coding scheme (MCS) field, a new data indicator (NDI) field, or a redundancy version (RV) field).

When zero padding or truncation is applied to the DCI, control based on a frequency domain resource assignment field may be performed based on the bandwidth of the BWP that is specified by the BI field in the DCI, except for a certain condition.

Incidentally, one or more CORESETs can be configured for one BWP. It is assumed that the TCI presence information indicating whether or not the TCI field is present in the DCI is configured for each CORESET of the BWP. For this reason, it is assumed that a plurality of CORESETs having different pieces of TCI presence information are configured for the same BWP.

However, when the BWP in which such a plurality of CORESETs having different pieces of TCI presence information are configured is switched to another BWP, the UE may be unable to appropriately control BWP switching due to that the sizes of pieces of DCI (for example, DCI format 1_1) to be monitored by the UE among the plurality of CORESETs are different.

Figure 2B:
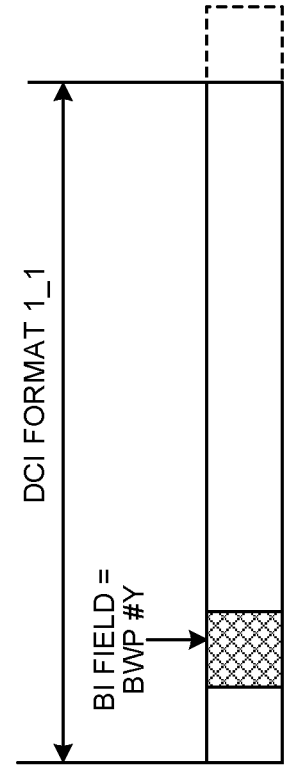

FIGS. 2A and 2B are diagrams to show an example of the DCI when BWP #X in which a plurality of CORESETs having different pieces of TCI presence information are configured is switched to BWP #Y. For example, in FIGS. 2A and 2B, CORESETs #A and #B are configured in BWP #X. In CORESET #A, the TCI presence information is enabled, and in CORESET #B, the TCI presence information is disabled.

As shown in FIG. 2A, in the DCI (for example, DCI format 1_1) mapped to search space #1 associated with CORESET #A of BWP the TCI field of a certain number of bits (for example, 3 bits) is included.

On the other hand, as shown in FIG. 2B, in the DCI (for example, DCI format 1_1) mapped to search space #2 associated with CORESET #B of BWP #X does not include the TCI field of a certain number of bits (for example, 3 bits).

In this manner, in order to prevent unmatch of the sizes of pieces of DCI mapped to a plurality of search spaces respectively associated with the plurality of CORESETs configured to have different pieces of TCI presence information, it is conceivable that zero is appended to a part of the DCI monitored in the plurality of search spaces until the size of the part of the DCI becomes equal to the maximum size of the pieces of DCI monitored in the plurality of search space. However, how to append zero to the part of the DCI has not yet been fully studied.

For example, in FIGS. 2A and 2B, it is assumed that zero is appended to the DCI monitored in search space #2 associated with CORESET #B of FIG. 2B until the size of the DCI becomes equal to the size of the DCI monitored in search space #1 associated with CORESET #A of FIG. 2A. However, at which position of the DCI monitored in search space #2 zero is appended presents a problem.

When zero is not appended to an appropriate position of the DCI shown in FIG. 2B, the UE may be unable to appropriately detect the DCI and to appropriately perform switching from BWP #X in which the DCI is detected to BWP #Y in which the PDSCH is scheduled by using the DCI. The UE may be unable to appropriately receive the PDSCH of BWP #Y scheduled by using the DCI.

In the light of this, the present inventions came up with the idea of appropriately appending zero to at least one piece of DCI mapped to a plurality of search spaces associated with a plurality of CORESETs configured in BWP #X to thereby cause the sizes of pieces of DCI mapped to the plurality of search spaces to match each other and thereby appropriately control switching from the BWP #X to BWP Y.

Specifically, the inventors of the present invention came up with the following idea: when a plurality of CORESTs configured to have different pieces of TCI presence information are configured in the same BWP, the UE appends zero after the last field of the DCI monitored in search space #2 associated with CORESET #B configured with the TCI presence information being disabled (first aspect), or appends zero to a position the same as that of the DCI monitored in search space #1 associated with CORESET #A configured with the TCI presence information being enabled in the DCI monitored in search space #2 (second aspect).

The present embodiment will be described below with reference to the drawings. Note that, in the present embodiment, a specific DCI format is DCI format 1_1 used for scheduling of the PDSCH, but this is not restrictive. In the present embodiment, the DCI may be any format as long as the DCI includes a certain field (for example, the TCI field) indicating the TCI state.

In one example, DCI format 1_1 includes the following fields in order, but this is not restrictive. It is only necessary that DCI format 1_1 includes at least one field illustrated below. The number of bits illustrated below is merely an example, and is not limited to the ones illustrated below.

Field for identifying the DCI format . . . 1 bit

Field for identifying the carrier (carrier indicator (CI) field) . . . 0 or 3 bits Field for identifying the BWP (BI field) . . . 0, 1, or 2 bits Field used for determination of the frequency domain resource assigned to the PDSCH (frequency domain resource assignment field) . . . for example, a certain number of bits determined based on the size of the BWP or the like Field used for determination of the time domain resource assigned to the PDSCH (time domain resource assignment field) . . . 0, 1, 2, 3, or 4 bits Field for specifying information related to mapping from a virtual resource block (VRB) to a physical resource block (PRB) . . . 0 or 1 bit Field indicating the bundling size of the PRB . . . 0 or 1 bit Field for specifying information related to rate matching . . . 0, 1, or 2 bits Field for specifying information related to a trigger of the CSI-RS of zero power . . . 0, 1, or 2 bits Field for specifying each of the modulation and coding scheme, the new data indicator, and the redundancy version for transport block 1 . . . 5 bits+1 bit+2 bits Field for specifying each of the modulation and coding scheme, the new data indicator, and the redundancy version for transport block 2 if transport block 2 is present . . . 0 bits or 5 bits+1 bit+2 bits Field for specifying a HARQ process number . . . 4 bits Field for specifying a downlink assignment index (DAI) . . . 4, 2, or 0 bits Field for indicating a transmission power control (TPC) command for the PUCCH . . . 2 bits Field for specifying a resource for the PUCCH . . . 3 bits Field for specifying feedback timing of the HARQ for the PDSCH . . . 0, 1, 2, or 3 bits Field for specifying an antenna port (antenna port field) . . . 4, 5, or 6 bits TCI Field . . . 0 or 3 bits Field for requesting transmission of a sounding reference signal (SRS) (SRS request field) . . . 2 bits Field for specifying which code block group (CBG) in the transport block is to be transmitted (CBG transmission information (CBGTI) field) . . . 0, 2, 4, 6, or 8 bits Field for specifying information related to flushing of the CBG (CBG flushing information (CBGFI (CBG flushing out information)) field) . . . 0 or 1 bit Field related to initialization of a sequence of the DMRS of the PDSCH (DMRS sequence initialization field) . . . 0 or 1 bit First Aspect In a first aspect, when a plurality of pieces of DCI are monitored in the search space associated with a plurality of CORESTs configured in the same BWP and the TCI presence information is configured in a part of the CORESETs, a certain number of zeros may be appended after the last field of the DCI (for example, DCI format 1_1) not including the TCI field.

In the first aspect, regarding the DCI monitored in the search space associated with the CORESET in which the TCI presence information is enabled, the TCI field of a certain number of bits (for example, 3 bits) may be present at a position (for example, after the antenna port field and before the SRS request field) determined by the DCI format.

In the first aspect, regarding the DCI monitored in the search space associated with the CORESET in which the TCI presence information is not enabled, zeros of a certain number of bits (for example, 3 bits) may be present after the last field (for example, the DMRS sequence initialization field) in the DCI.

The UE may assume the position (field position) of each field in the DCI, depending on in which search space associated with the CORESET the DCI is monitored (detected).

Figure 3A:
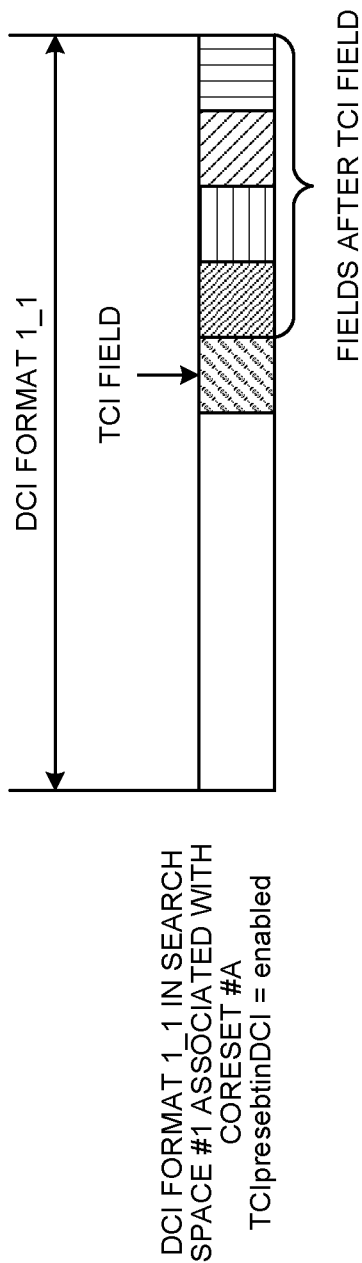
FIGS. 3A and 3B are diagrams to show an example of DCI monitored in search spaces associated with a plurality of CORESETs according to a first aspect.
Figure 3B:
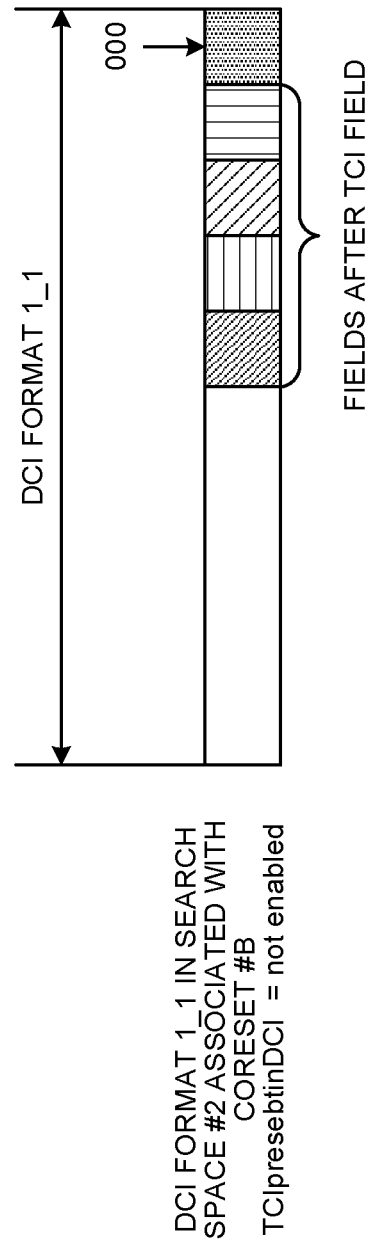

FIGS. 3A and 3B are diagrams to show an example of the DCI monitored in a plurality of search spaces associated with a plurality of CORESETs according to the first aspect. For example, in FIGS. 3A and 3B, CORESETs #A and #B are configured for BWP #X. In CORESET #A (second control resource set), the TCI presence information is enabled, and in CORESET #B (first control resource set), the TCI presence information is disabled (or is not enabled).

Note that, in FIGS. 3A and 3B, the TCI field in the DCI (for example, DCI format 1_1) is 3 bits, but this is not restrictive. In FIGS. 3A and 3B, fields after the TCI field include the SRS request field, the CBGTI field, the CBGFI field, and the DMRS sequence initialization field, but this is not restrictive. After the TCI field, one or more fields may be included, or other fields may not be included (the TCI field may be the last field).

As shown in FIG. 3A, in the DCI mapped to search space #1 associated with CORESET #A, the TCI field of 3 bits is included at a certain field position. On the other hand, as shown in FIG. 3B, in the DCI (for example, DCI format 1_1) mapped to search space #2 associated with CORESET #B, zeros of 3 bits "000" are appended after the last field.

In FIGS. 3A and 3B, the position of each field after the TCI field is different depending on with which one of CORESET #A in which the TCI presence information is enabled and CORESET #B in which the TCI presence information is enabled the DCI detected in the search space is associated.

The UE may determine the position of each field after the TCI field in the DCI, based on with which CORESET the search space in which the DCI is detected is associated (specifically, with which one of the CORESET in which the TCI presence information is enabled and the CORESET in which the TCI presence information is disabled the search space is associated). The UE may control decoding of the DCI, based on the determined position of each field.

Note that cyclic redundancy check (CRC) bits may be appended to or included in the DCI shown in FIGS. 3A and 3B. The size (payload size) of the DCI may or may not include the number of the CRC bits. The CRC bits may be scrambled (may be masked) with a certain radio network temporary indicator (RNTI).

In FIG. 3B, the zeros of 3 bits that are appended instead of the TCI field may be appended before the CRC bits, or may be appended after the CRC bits.

Figure 4:
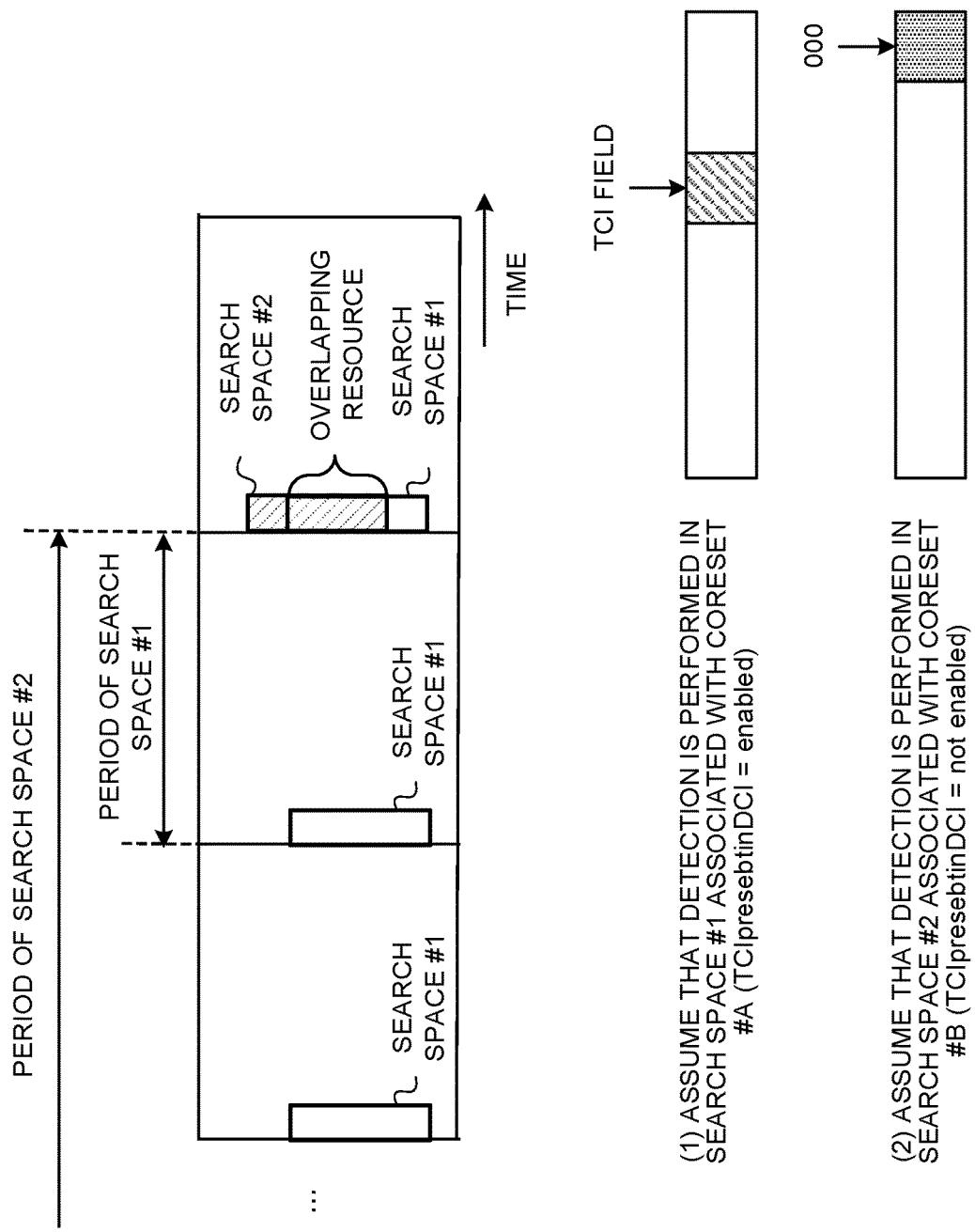
FIG. 4 is a diagram to show another example of DCI monitored in search spaces associated with a plurality of CORESETs according to the first aspect.

FIG. 4 is a diagram to show another example of the DCI monitored in a plurality of search spaces associated with a plurality of CORESETs according to the first aspect. FIG. 4 shows an example of a case in which at least a part of PDCCH candidates (candidate resources) for the DCI (for example, DCI format 1_1) overlap in search spaces #1 and #2 respectively associated with CORESETs #A and #B having different pieces of (configurations of) the TCI presence information.

For example, in FIG. 4, search space #1 associated with CORESET #A in which the TCI presence information is enabled and search space #2 associated with CORESET #B in which the TCI presence information is disabled are configured for the UE with different periods. At least a part of the PDCCH candidates in search spaces #1 and #2 collide with each other in a certain slot.

In the case of FIG. 4, the UE may assume any one of the following (1) to (4) regarding the DCI detected in the PDCCH candidate (overlapping part) overlapping between search spaces #1 and #2.

(1) The UE may assume that the DCI detected in the PDCCH candidate overlapping between search spaces #1 and #2 is detected in search space #1 associated with CORESET #A in which the TCI presence information is enabled. In this case, the UE may control reception processing (for example, decoding, demodulation, or the like) of the DCI, by assuming that the TCI field is included at a certain field position (for example, FIG. 3A). The UE may control the reception processing of the PDSCH, based on the TCI state indicated by the value of the TCI field in the DCI.

(2) The UE may assume that the DCI detected in the PDCCH candidate overlapping between search spaces #1 and #2 is detected in search space #2 associated with CORESET #B in which the TCI presence information is disabled. In this case, the UE may control the reception processing (for example, decoding, demodulation, or the like) of the DCI, by assuming that each field is included at each field position (for example, FIG. 3B).

In the case of (2), the UE may control the reception processing of the PDSCH, based on the TCI state associated with CORESET #B, by assuming that the TCI state is the same as the PDCCH transmitted in CORESET B.

(3) Regarding the DCI detected in the PDCCH candidate overlapping between search spaces #1 and #2, in which search space associated with either CORESET #A in which the TCI presence information is enabled or CORESET #B in which the TCI presence information is enabled the UE assumes detection is performed may be up to implementation of the UE.

(4) The UE may not assume that the PDCCH candidates overlap between the plurality of search spaces #1 and #2 respectively associated with the plurality of CORESETs #A and #B having different pieces of (configurations of) the TCI presence information. In this case, the base station may configure all of the PDCCH candidates in the search spaces #1 and #2 with different resources, or may map the DCI to the PDCCH candidates that do not overlap between search spaces #1 and #2.

In the first aspect, zeros of a certain number of bits (as many bits as those of the TCI field, for example, 3 bits) are appended after the last field of the DCI detected in search space #2 associated with CORESET #B in which the TCI presence information is disabled. For this reason, also when the plurality of CORESETs #A and #B having different pieces of TCI presence information are configured in the BWP, the sizes of pieces of DCI monitored in search spaces #1 and #2 respectively associated with the CORESETs #A and #B can be equal to each other.

Second Aspect

In a second aspect, when a plurality of pieces of DCI are monitored in the search space associated with a plurality of CORESTs configured in the same BWP, a certain number of zeros are appended to the same position as the DCI including the TCI field, instead of appending a certain number of zeros to the last of the DCI not including the TCI field. The difference from the first aspect will mainly be described below.

In the second aspect, regarding the DCI monitored in the search space associated with the CORESET in which the TCI presence information is enabled, the TCI field of a certain number of bits (for example, 3 bits) may be present at a position (for example, after the antenna port field and before the SRS request field) determined by the DCI format.

In the second aspect, regarding the DCI monitored in the search space associated with the CORESET in which the TCI presence information is not enabled, the zeros of a certain number of bits (for example, 3 bits) may be appended (may be present) at the same position as the TCI field of the DCI monitored in the search space associated with the CORESET in which the TCI presence information is enabled (for example, after the antenna port field and before the SRS request field).

In the second aspect, the UE can determine the position (field position) of each field other than the TCI field in the DCI, regardless of (depending on) in which search space associated with the CORESET the DCI is monitored (detected).

Figure 5A:
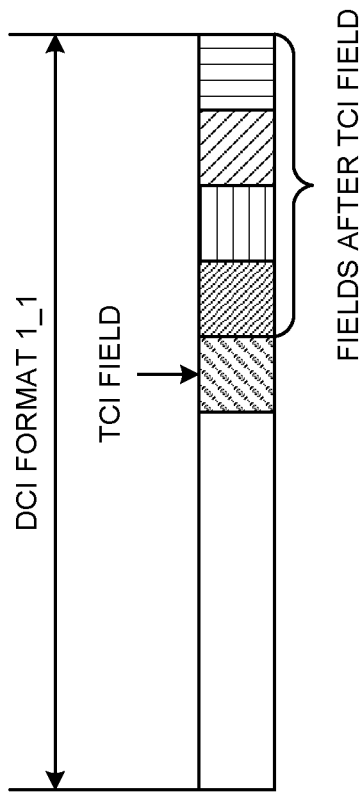
FIGS. 5A and 5B are diagrams to show an example of DCI monitored in search spaces associated with a plurality of CORESETs according to a second aspect.
Figure 5B:
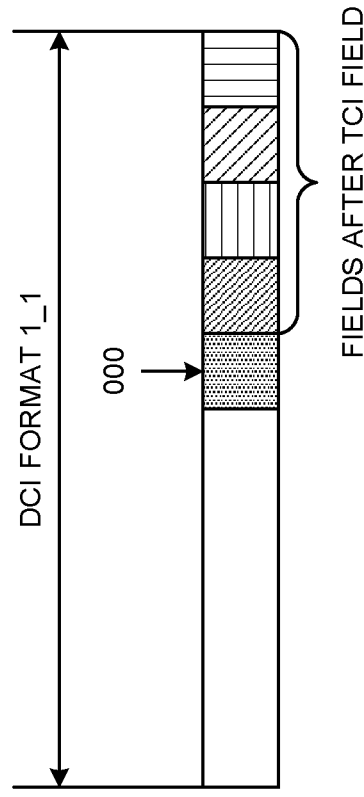

FIGS. 5A and 5B are diagrams to show an example of the DCI associated with a plurality of CORESETs according to the second aspect. The precondition of FIGS. 5A and 5B is the same as that of FIGS. 3A and 3B, and the difference from FIGS. 3A and 3B will mainly be described below.

As shown in FIG. 5A, in the DCI mapped to the search space associated with CORESET #A, the TCI field of 3 bits is included at a certain field position. On the other hand, as shown in FIG. 5B, in the DCI (for example, DCI format 1_1) mapped to the search space associated with CORESET #B, zeros of 3 bits "000" are appended to the same position as the TCI field of FIG. 5A.

In FIGS. 5A and 5B, the position of each field after the TCI field is the same regardless of with which one of CORESET #A in which the TCI presence information is enabled and CORESET #B in which the TCI presence information is enabled the DCI detected in the search space is associated.

The UE may determine the position of each field after the TCI field in the DCI, regardless of with which CORESET the search space in which the DCI is detected is associated (specifically, with which one of the CORESET in which the TCI presence information is enabled and the CORESET in which the TCI presence information is disabled the search space is associated). The UE may control decoding of the DCI, based on the determined position of each field.

Note that CRC bits may be appended to or included in the DCI shown in FIGS. 5A and 5B. The size (payload size) of the DCI may or may not include the number of the CRC bits.

Figure 6:
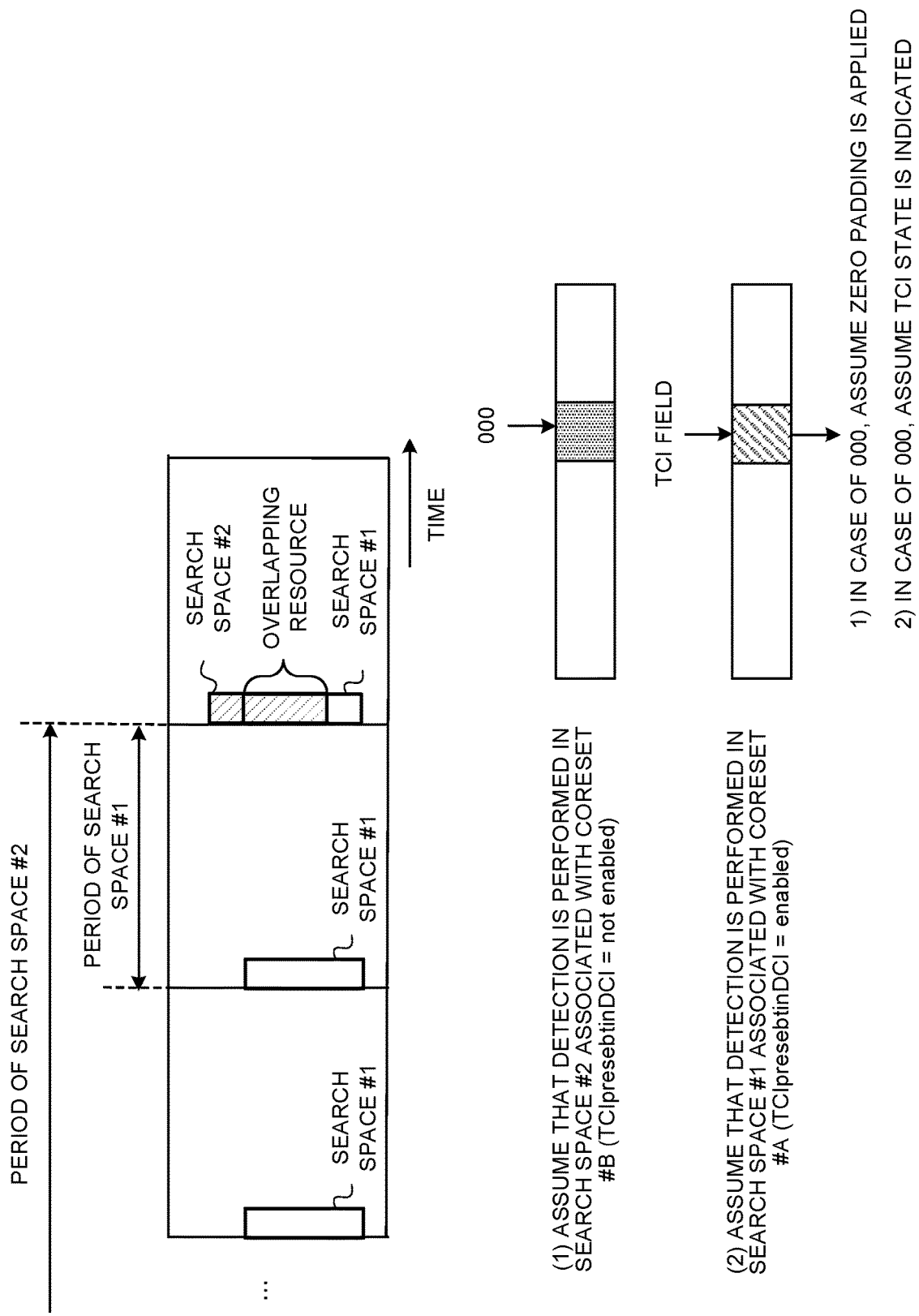
FIG. 6 is a diagram to show another example of DCI associated with a plurality of CORESETs according to the second aspect.

FIG. 6 is a diagram to show another example of the DCI associated with a plurality of CORESETs according to the second aspect. The precondition of FIG. 6 is the same as that of FIG. 4, and the difference from FIG. 4 will mainly be described below.

For example, in FIG. 6, search space #1 associated with CORESET #A in which the TCI presence information is enabled and search space #2 associated with CORESET #B in which the TCI presence information is disabled are configured for the UE with different periods. At least a part of the PDCCH candidates in search spaces #1 and #2 collide with each other in a certain slot.

In the case of FIG. 6, the UE may assume any one of the following (1) to (4) regarding the DCI detected in the PDCCH candidate (overlapping part) overlapping between search spaces #1 and #2.

(1) The UE may assume that the DCI detected in the PDCCH candidate overlapping between search spaces #1 and #2 is detected in search space #2 associated with CORESET #13 in which the TCI presence information is disenabled. In this case, the UE may assume that the TCI state of the PDSCH scheduled by using the DCI is the same as the TCI state associated with CORESET #13 (TCI state of the PDCCH transmitted in CORESET #13), in other words, is in QCL with the DMRS of the PDCCH transmitted in CORESET B.

A network (for example, the base station) may configure zeros (for example, in a case of 3 bits, "000") for the TCI field in DCI detected in the PDCCH candidate overlapping between search spaces #1 and #2. The UE may discard the DCI when a value other than zero is configured for the TCI field in the DCI detected in the PDCCH candidate overlapping between search spaces #1 and #2.

(2) The UE may assume that the DCI detected in the PDCCH candidate overlapping between search spaces #1 and #2 is detected in search space #1 associated with CORESET #A in which the TCI presence information is enabled. In this case, a network (for example, the base station) may configure any value (for example, in a case of 3 bits, any of "000" to "111") for the TCI field in the DCI detected in the PDCCH candidate overlapping between search spaces #1 and #2.

The UE may control the reception processing of the PDSCH, based on the TCI state indicated by the value of the TCI field in the DCI.

(3) Regarding the DCI detected in the PDCCH candidate overlapping between search spaces #1 and #2, in which search space associated with either CORESET #A in which the TCI presence information is enabled or CORESET #13 in which the TCI presence information is enabled the UE assumes detection is performed may be up to implementation of the UE.

Note that whether or not such assumption can be up to implementation of the UE may be determined based on the value of the TCI field in the DCI. For example, in a case that the UE detects the TCI field in the DCI with a value (code point) other than zero (for example, in a case of 3 bits, "000", the UE may assume that the DCI is detected in the search space associated with CORESET #A in which the TCI presence information is enabled.

On the other hand, in a case that the UE detects the TCI field in the DCI with a value of zero, in which search space associated with either CORESET #A or #13 the UE assumes the DCI is detected may be up to implementation of the UE.

(4) The UE may not assume that the PDCCH candidates overlap between the plurality of search spaces #1 and #2 respectively associated with the plurality of CORESETs #A and #B having different pieces of (configurations of) the TCI presence information. In this case, the base station may configure all of the PDCCH candidates in the search spaces #1 and #2 with different resources, or may map the DCI to the PDCCH candidates that do not overlap between search spaces #1 and #2.

In the case of (2) or (3) described above, when the UE detects the DCI with zero (for example, in a case of 3 bits, "000") at the field position of the TCI field in the PDCCH candidate (overlapping part) overlapping between search spaces #1 and #2 and assumes that the DCI is detected in search space #1 associated with CORESET #A in which the TCI presence information is enabled, the UE may assume any of the following 1) and 2) regarding the zero.

1) The UE may assume that the zero at the field position of the TCI field in the DCI is zero padding, and is no informative value. In the case of assumption 1), the UE may assume that the TCI state of the PDSCH is the same as the TCI state associated with CORESET #B in which the DCI presence information is enabled (TCI state of the PDCCH for transmitting the DCI).

In the case of assumption 1), the UE may operate in a manner similar to when the TCI presence information is not configured in the CORESET for scheduling the PDSCH or when the PDSCH is scheduled by using DCI format 1_0.

2) The UE may assume that the zero at the field position of the TCI field in the DCI is the TCI field value. In the case of assumption 2), the UE may assume that the TCI state of the PDSCH is the TCI state indicated by the TCI field value (specifically, zero).

In the case of assumption 2), for example, it may be assumed that the TCI state indicated by the TCI field value (zero) indicates an indicator of the DL-RS (for example, the CSI-RS or the SSB) in QCL with the PDSCH (for example, a CRI-RS Resource Indicator (CRI) or an SSB index). The UE may control the reception processing of the PDSCH, by assuming that the DL-RS indicated by the indicator and the PDSCH are in a relationship of QCL.

In the second aspect, zeros of a certain number of bits (as many bits as those of the TCI field, for example, 3 bits) are appended to the DCI detected in the search space associated with CORESET #B in which the TCI presence information is disabled at the field position the same as the DCI including the TCI field. For this reason, regardless of whether the search space is associated with CORESET #A in which the TCI presence information is enabled or CORESET #B in which the TCI presence information is disabled in the same BWP, the sizes of pieces of DCI detected in the search space can be equal to each other.

Third Aspect

In a third aspect, the operation at the time of switching from BWP #X in which a plurality of CORESTs are configured to BWP #Y in the first or second aspect will be described in detail.

FIGS. 7A and 7B are diagrams to show an example of BWP switching according to the third aspect. In FIGS. 7A and 7B, BWP #Y that is different from the current active BWP #X is specified by the BI field in the DCI. In FIGS. 7A and 7B, as described in the first aspect, zero is appended to a part of the DCI.

Specifically, as shown in FIGS. 7A and 7B, a certain number of zeros are appended to the DCI monitored in search space #2 associated with CORESET #B in which the TCI presence information is disabled, at the position after the last field. For this reason, the size of the DCI can be equal to that of the DCI monitored in search space #1 associated with CORESET #A in which the TCI presence information is enabled. In this manner, the UE can appropriately control the switching from BWP #X to BWP Y.

FIGS. 8A and 8B are diagrams to show another example of BWP switching according to the third aspect. FIGS. 8A and 8B are different from FIGS. 7A and 7B in that zero is appended to a part of the DCI as described in the second aspect.

Specifically, as shown in FIGS. 8A and 8B, a certain number of zeros are appended to the DCI monitored in search space #2 associated with CORESET #B in which the TCI presence information is disabled, at the position the same as the TCI field of the DCI monitored in search space #1 associated with CORESET #A in which the TCI presence information is disabled. For this reason, the size of the DCI can be equal to that of the DCI monitored in search space #1 associated with CORESET #A in which the TCI presence information is enabled. In this manner, the UE can appropriately control the switching from BWP #X to BWP Y.

Additional Notes

In the present embodiment, the "CORESET" and the "search space" may be replaced with each other. Specifically, the "DCI monitored or detected in the search space associated with a certain CORESET" may be replaced with the "DCI monitored or detected in a certain CORESET" or the "DCI monitored or detected in a certain search space" as appropriate.

In the present embodiment, the "DCI" and the "DCI format" may be replaced with each other. "Monitoring of the DCI" may be replaced with blind decoding, monitoring, or the like of the DCI. "Detecting of the DCI" may be detecting of the DCI with a specific DCI format.

(Radio Communication System)

Hereinafter, a structure of a radio communication system according to the present embodiment will be described. In this radio communication system, the radio communication method according to each embodiment of the present disclosure described above may be used alone or may be used in combination for communication.

Figure 9:
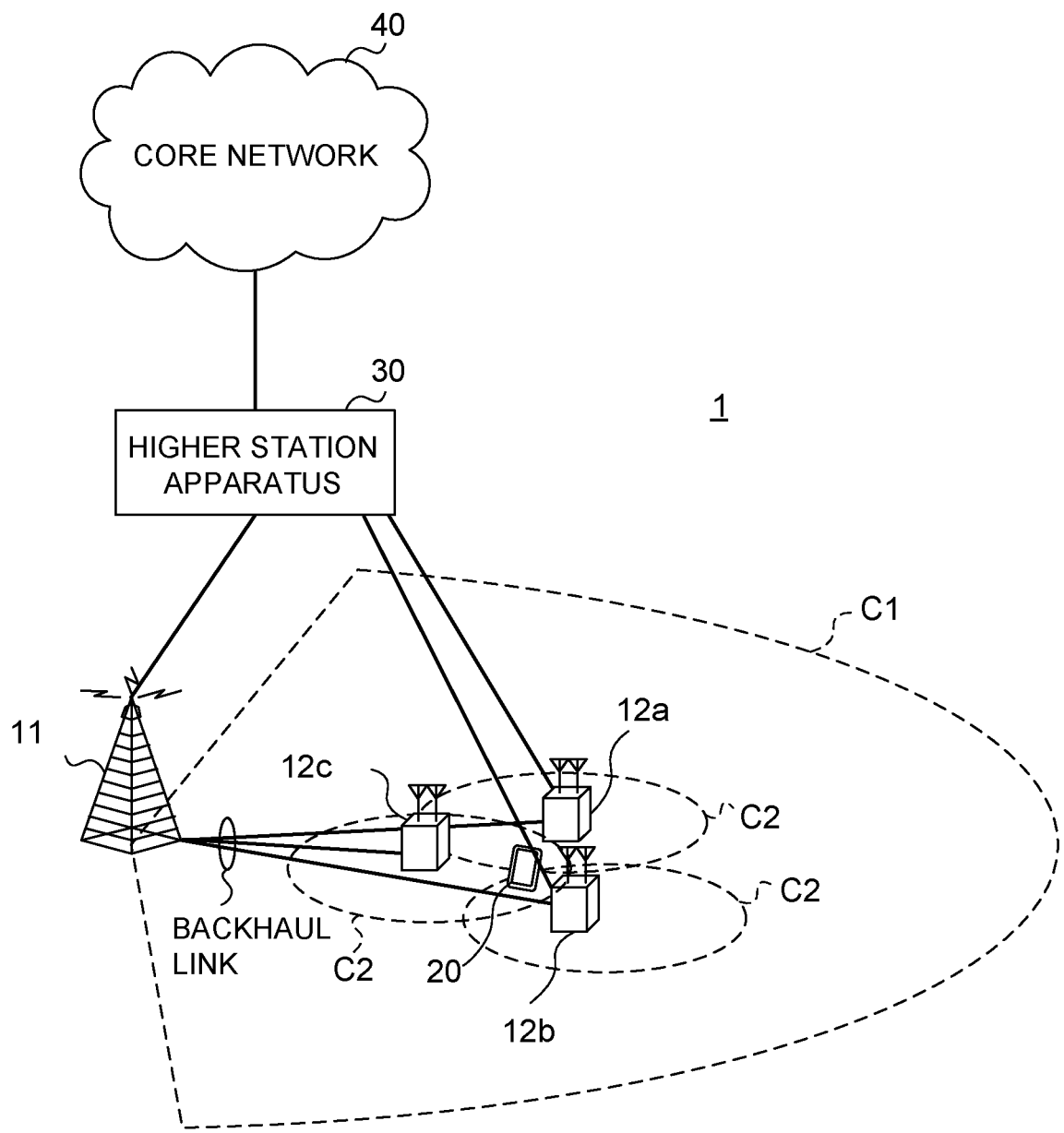
FIG. 9 is a diagram to show an example of a schematic structure of a radio communication system according to the present embodiment.

FIG. 9 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where a certain bandwidth constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 may support dual connectivity (multi-RAT dual connectivity (MR-DC)) between a plurality of RATS (Radio Access Technologies). The MR-DC may include dual connectivity (EN-DC (E-UTRA-NR Dual Connectivity)) of LTE and NR in which the base station (eNB) of LTE (E-UTRA) serves as a master node (MN) and the base station (gNB) of NR serves as a secondary node (SN), dual connectivity (NE-DC (NR-E-UTRA Dual Connectivity)) of NR and LTE in which the base station (gNB) of NR serves as the MN and the base station (eNB) of LTE (E-UTRA) serves as the SN, and the like. The radio communication system 1 may support dual connectivity between a plurality of base stations in the same RAT (for example, dual connectivity (NN-DC (NR-NR Dual Connectivity)) where both of an MN and an SN are base stations (gNB) of NR).

The radio communication system 1 includes a base station 11 that forms a macro cell C1 of a relatively wide coverage, and base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the base station 11 and the base stations 12. It is assumed that the user terminals 20 use the macro cell C1 and the small cells C2 at the same time by means of CA or DC. The user terminals 20 can execute CA or DC by using a plurality of cells (CCs) (for example, five or less CCs or six or more CCs).

Between the user terminals 20 and the base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the base stations 12, a carrier of a relatively high frequency band (for example, 3.5 GHz, 5 GHz, and so on) and a wide bandwidth may be used, or the same carrier as that used between the user terminals 20 and the base station 11 may be used. Note that the structure of the frequency band for use in each base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the base station 11 and the base stations 12 (or between two base stations 12).

The base station 11 and the base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each base station 12 may be connected with the higher station apparatus 30 via the base station 11.

Note that the base station 11 is a base station having a relatively wide coverage, and may be referred to as a "macro base station," a "central node," an "eNB (eNodeB)," a "transmitting/receiving point" and so on. The base stations 12 are base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. The DCI for scheduling DL data (for example, PDSCH) reception and/or measurement of a DL reference signal may be referred to as a DL assignment, a DL grant, DL DCI, or the like. The DCI for scheduling UL data (for example, PUSCH) transmission and/or transmission of a UL sounding (measurement) signal may be referred to as a UL grant, a UL DCI, or the like.

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Base Station)

Figure 10:
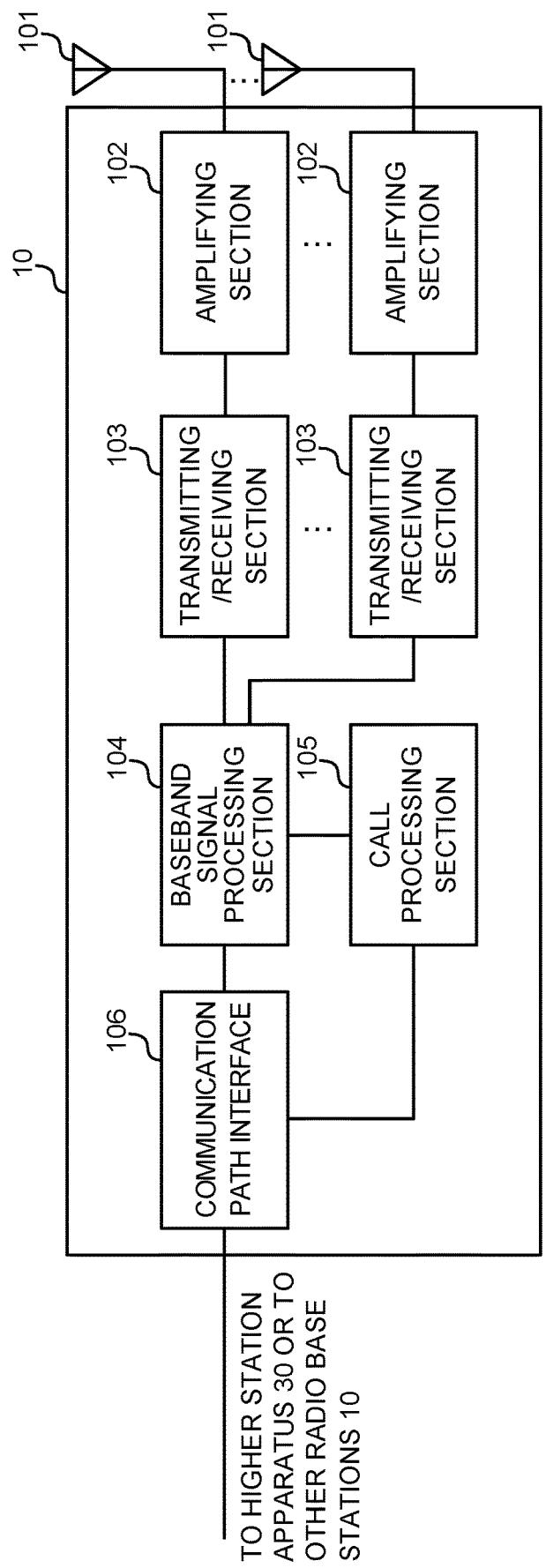
FIG. 10 is a diagram to show an example of an overall structure of a base station according to the present embodiment.

FIG. 10 is a diagram to show an example of an overall structure of the base station according to the present embodiment. A base station 10 includes a plurality of transmitting/receiving antennas 101, amplifying sections 102, transmitting/receiving sections 103, a baseband signal processing section 104, a call processing section 105 and a communication path interface 106. Note that the base station 10 may be configured to include one or more transmitting/receiving antennas 101, one or more amplifying sections 102 and one or more transmitting/receiving sections 103.

User data to be transmitted from the base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other base stations 10 via an inter-base station interface (for example, an optical fiber in compliance with the CPRI (Common Public Radio Interface) and an X2 interface).

Figure 11:
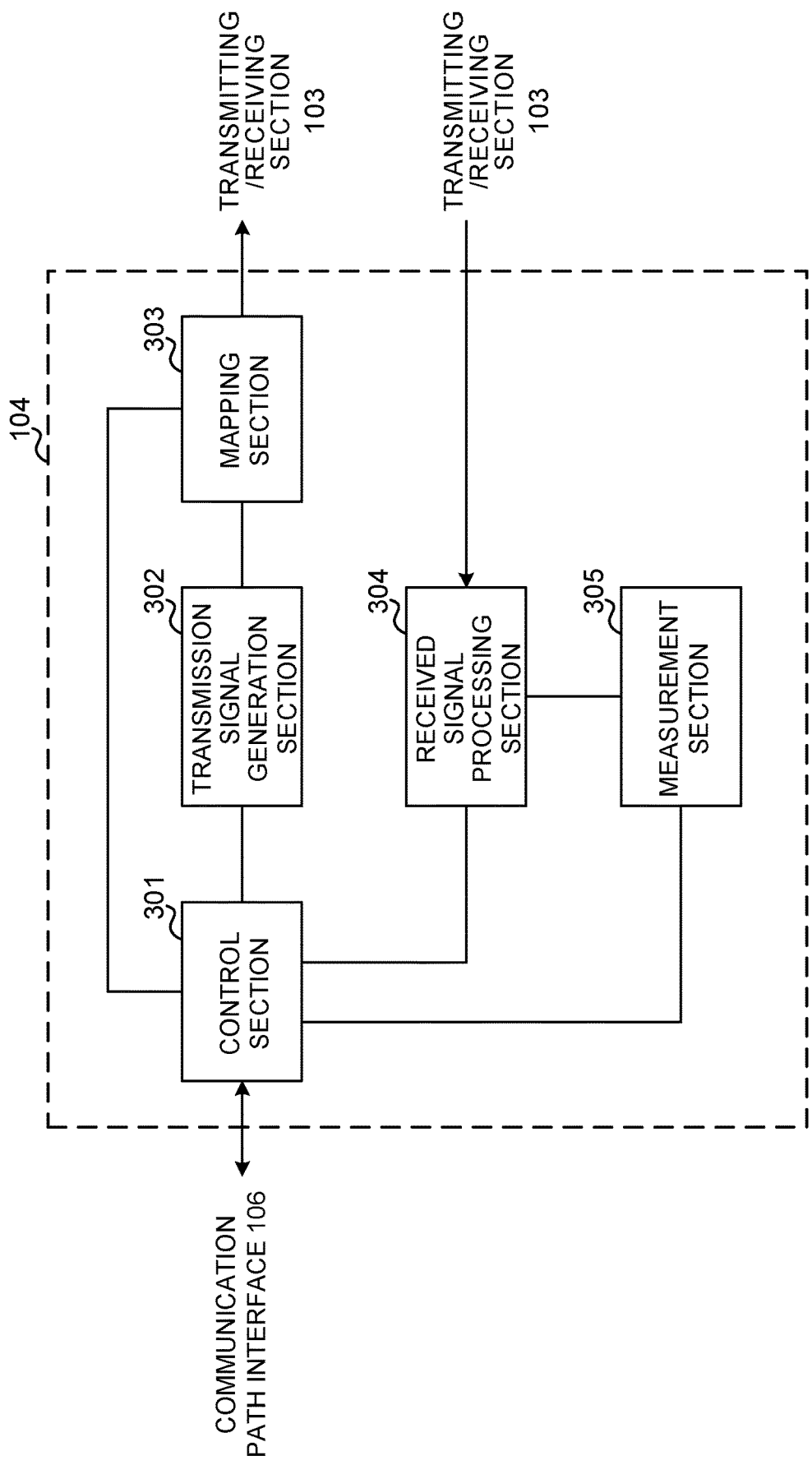
FIG. 11 is a diagram to show an example of a functional structure of the base station according to the present embodiment.

FIG. 11 is a diagram to show an example of a functional structure of the base station according to the present embodiment. Note that, the present example primarily shows functional blocks that pertain to characteristic parts of the present embodiment, and it is assumed that the base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the base station 10, and some or all of the structures do not need to be included in the baseband signal processing section 104.

The control section (scheduler) 301 controls the whole of the base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), and a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

Note that the transmitting/receiving section 103 may transmit various pieces of configuration information, the downlink control information, the downlink shared channel, the downlink reference signal, and so on. Specifically, the transmitting/receiving section 103 may transmit configuration information of a plurality of control resource sets configured in the partial band in the carrier.

The control section 301 may control transmission processing (for example, transmission, mapping, modulation, coding, or the like) of the downlink control information and the downlink shared channel. Specifically, the control section 301 may control, when the plurality of control resource sets configured in the partial band in the carrier are configured to have different pieces of presence information indicating whether or not a certain field indicating the state of the transmission configuration indicator is present in a specific downlink control information (DCI) format, transmission of the downlink control information of the specific DCI format in the plurality of search spaces respectively associated with the plurality of control resource sets.

(User Terminal)

Figure 12:
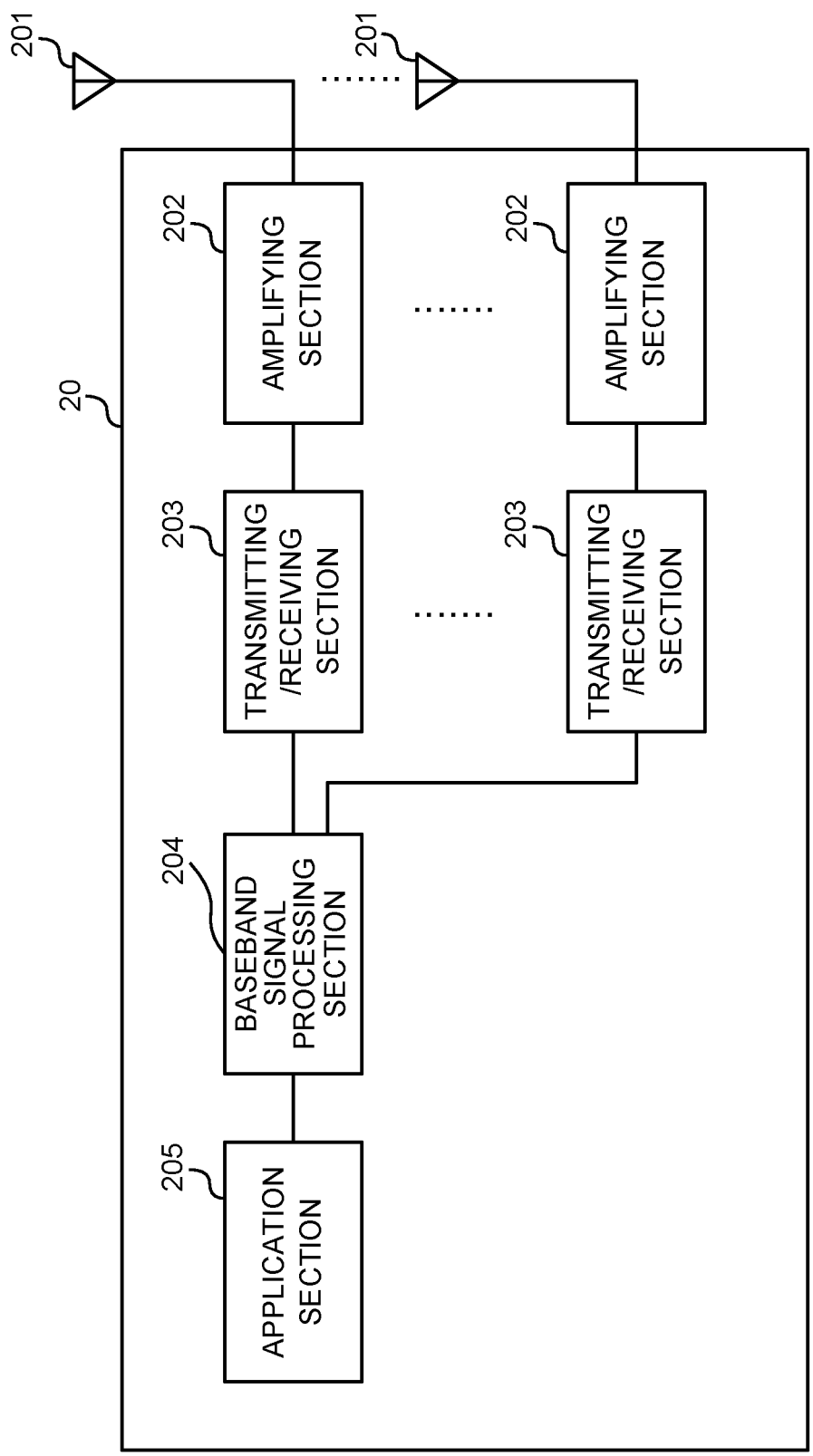
FIG. 12 is a diagram to show an example of an overall structure of a user terminal according to the present embodiment.

FIG. 12 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Figure 13:
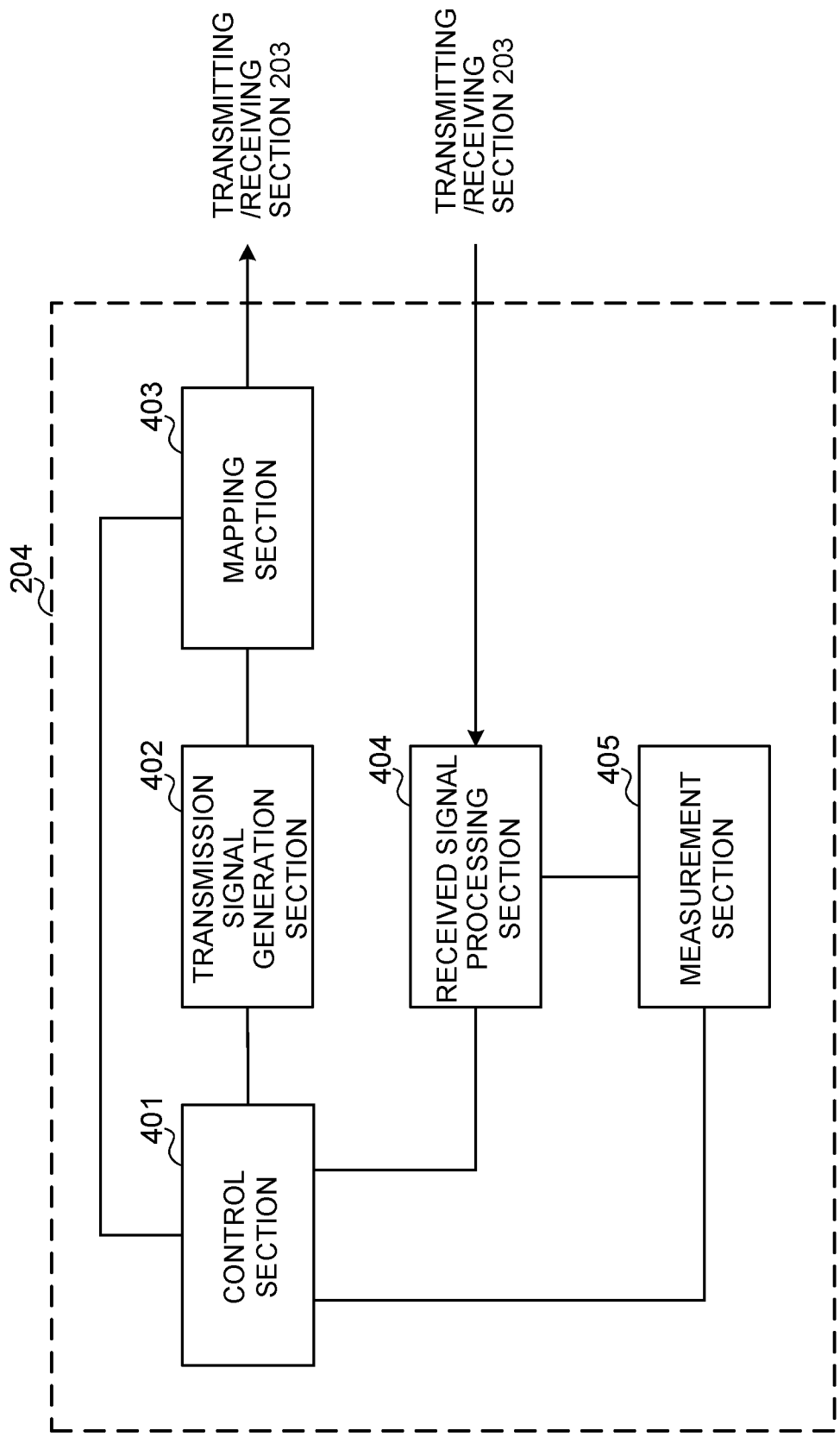
FIG. 13 is a diagram to show an example of a functional structure of the user terminal according to the present embodiment.

FIG. 13 is a diagram to show an example of a functional structure of the user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the base station 10, from the received signal processing section 404. The control section 401 controls generation of an uplink control signal and/or an uplink data signal, based on the results of determining necessity or not of retransmission control to a downlink control signal and/or a downlink data signal.

If the control section 401 acquires a variety of information reported by the base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that the transmitting/receiving section 203 may receive various pieces of configuration information, the downlink control information, the downlink shared channel, the downlink reference signal, and so on. Specifically, the transmitting/receiving section 203 may receive configuration information of a plurality of control resource sets configured in the partial band in the carrier.

The control section 401 may control reception processing (for example, reception, demapping, demodulation, decoding, or the like) of the downlink control information and the downlink shared channel. Specifically, the control section 401 may control, when the plurality of control resource sets configured in the partial band in the carrier are configured to have different pieces of presence information indicating whether or not a certain field indicating the state of the transmission configuration indicator is present in a specific downlink control information (DCI) format, monitoring of the downlink control information of the specific DCI format in the plurality of search spaces respectively associated with the plurality of control resource sets.

Zero may be appended to the downlink control information monitored in a first search space associated with a first control resource set in which the presence information is not enabled, at the position after the last field of the specific DCI format (first aspect, FIG. 3B).

When at least a part of the candidate resources for the specific DCI format overlap between the first search space and a second search space associated with a second control resource set in which the presence information is enabled, the control section 401 may assume that the downlink control information detected in the overlapping candidate resource is detected in the first search space or the second search space (first aspect, FIG. 4).

Zero may be appended to the downlink control information monitored in the first search space associated with the first control resource set in which the presence information is not enabled, at the position the same as the downlink control information monitored in the second search space associated with the second control resource set in which the presence information is enabled (second aspect, FIG. 5B).

When at least a part of the candidate resources for the specific DCI format overlap between the first search space and the second search space, the control section 401 may assume that the downlink control information detected in the overlapping candidate resource is detected in the first search space or the second search space (second aspect, FIG. 6).

When the control section 401 assumes that the downlink control information detected in the overlapping candidate resource is detected in the first search space, the control section 401 may assume that the state of the transmission configuration indicator of the downlink shared channel scheduled by using the downlink control information is the same as the state of the TCI associated with the first control resource set, or may assume that the state of the transmission configuration indicator of the downlink shared channel is indicated by zero set in the certain field in the downlink control information (second aspect, FIG. 6).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
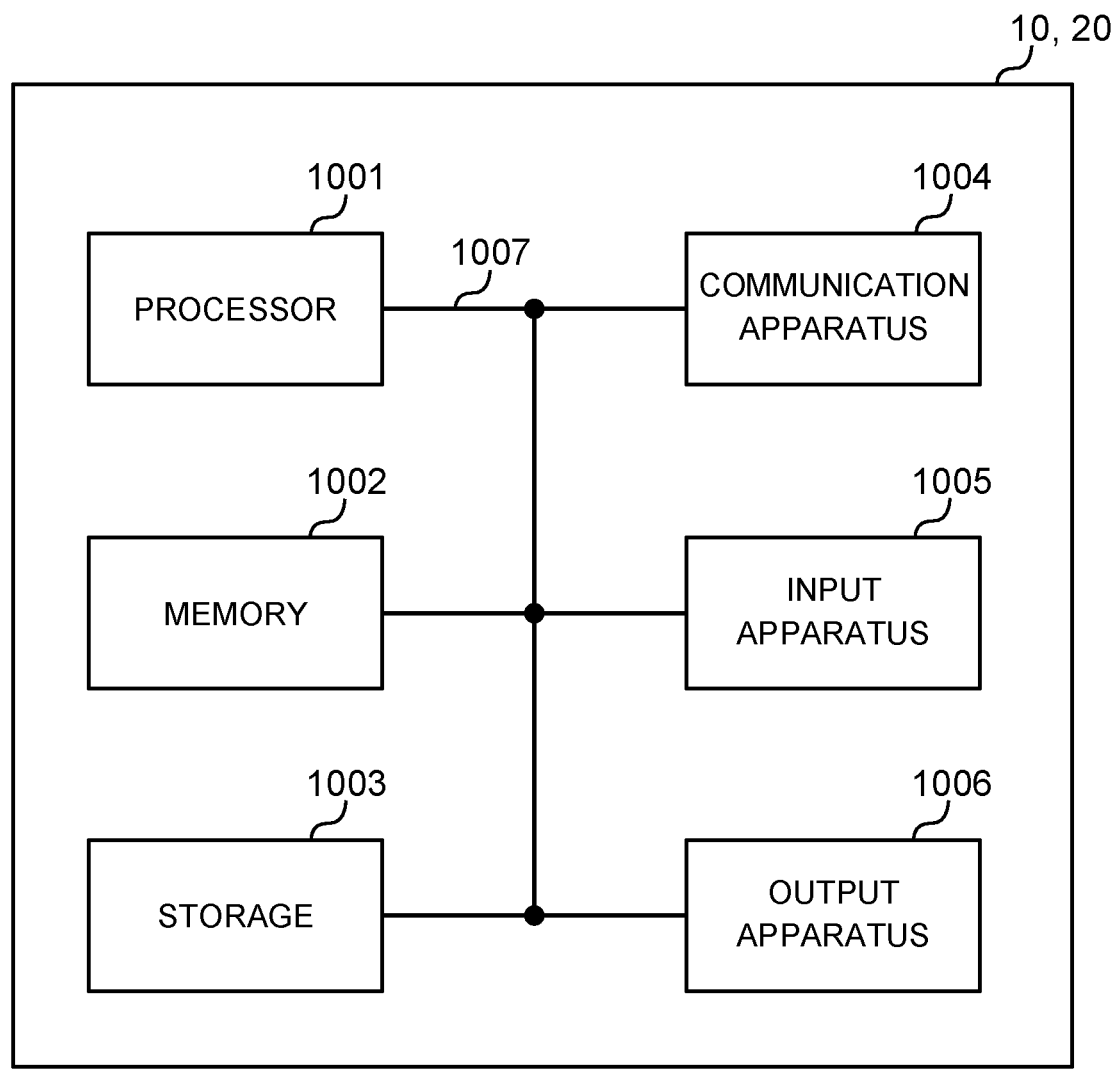
FIG. 14 is a diagram to show an example of a hardware structure of the base station and the user terminal according to the present embodiment.

For example, a base station, a user terminal, and so on according to the present embodiment of the present disclosure may function as a computer that executes the processes of the radio communication method of the present disclosure. FIG. 14 is a diagram to show an example of a hardware structure of the base station and the user terminal according to the present embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section 103, the transmitting section 103a and the receiving section 103b can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on).

Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "usual TTI" (TTI in LTE Rel. 8 to Rel. 12), a "normal TTI," a "long TTI," a "usual subframe," a "normal subframe," a "long subframe," a "slot" and so on. A TTI that is shorter than a usual TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a usual TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure may be used interchangeably.

In the present disclosure, the terms such as "precoding", "precoder", "weight (precoding weight)", "quasi-co-location (QCL)", "transmission power", "phase rotation", "antenna port", "antenna port group", "layer", "number of layers", "rank", "beam", "beam width", "beam angle", "antenna", "antenna element", and "panel" may be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms such as "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives configuration information of a plurality of control resource sets configured in a partial band in a carrier; and
   a processor that controls, when the plurality of control resource sets are configured to have different presence information indicating whether or not a certain field indicating a state of a transmission configuration indicator is present in a specific downlink control information (DCI) format, monitoring of downlink control information of the specific DCI format in a plurality of search spaces respectively associated with the plurality of control resource sets,
   wherein zero is appended to the downlink control information, monitored in a first search space associated with a first control resource set in which the presence information is not enabled, at a position after a last field of the specific DCI format.

2. The terminal according to claim 1, wherein when at least a part of a candidate resource for the specific DCI format overlaps between the first search space and a second search space associated with a second control resource set in which the presence information is enabled, the processor detects the downlink control information in the overlapping candidate resource on the first search space or the second search space.

3. A radio communication method for a terminal, comprising:
   receiving configuration information of a plurality of control resource sets configured in a partial band in a carrier; and
   controlling, when the plurality of control resource sets are configured to have different presence information indicating whether or not a certain field indicating a state of a transmission configuration indicator is present in a specific downlink control information (DCI) format, monitoring of downlink control information of the specific DCI format in a plurality of search spaces respectively associated with the plurality of control resource sets,
   wherein zero is appended to the downlink control information, monitored in a first search space associated with a first control resource set in which the presence information is not enabled, at a position after a last field of the specific DCI format.

4. A system comprising a terminal and a base station, wherein:
   the terminal comprises:
      a receiver that receives configuration information of a plurality of control resource sets; and
      a processor that controls, when the plurality of control resource sets are configured to have different presence information indicating whether or not a certain field indicating a state of a transmission configuration indicator is present in a specific downlink control information (DCI) format, monitoring of downlink control information of the specific DCI format in a plurality of search spaces respectively associated with the plurality of control resource sets,
      wherein zero is appended to the downlink control information, monitored in a first search space associated with a first control resource set in which the presence information is not enabled, at a position after a last field of the specific DCI format, and
   the base station comprises:
      a transmitter that transmits the configuration information of the plurality of control resource sets configured in a partial band in a carrier.

* * * * *